(12) United States Patent
Ianev et al.

(10) Patent No.: US 11,160,015 B2
(45) Date of Patent: Oct. 26, 2021

(54) ISOLATED NETWORK SLICE SELECTION

(71) Applicant: NEC Laboratories Europe GmbH, Heidelberg (DE)

(72) Inventors: Iskren Ianev, Lower Earley (GB); Linghang Fan, Woking (GB); Sivasubramaniam Ramanan, Harrow (GB); Hassan Al-Kanani, Iver (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/041,525

(22) PCT Filed: Mar. 27, 2019

(86) PCT No.: PCT/EP2019/057798
§ 371 (c)(1),
(2) Date: Sep. 25, 2020

(87) PCT Pub. No.: WO2019/185758
PCT Pub. Date: Oct. 3, 2019

(65) Prior Publication Data
US 2021/0014781 A1 Jan. 14, 2021

(30) Foreign Application Priority Data
Mar. 27, 2018 (EP) .................................... 18164393

(51) Int. Cl.
*H04W 48/18* (2009.01)
*H04W 68/00* (2009.01)

(52) U.S. Cl.
CPC ........... *H04W 48/18* (2013.01); *H04W 68/00* (2013.01)

(58) Field of Classification Search
CPC ..... H04W 48/18; H04W 76/15; H04B 7/0413
USPC .......................................................... 455/458
See application file for complete search history.

(56) References Cited

U.S. PATENT DOCUMENTS

| | | | |
|---|---|---|---|
| 2018/0192445 A1* | 7/2018 | Jiang | H04W 72/0466 |
| 2018/0227871 A1* | 8/2018 | Singh | H04W 12/068 |
| 2018/0324577 A1* | 11/2018 | Faccin | H04W 76/27 |
| 2019/0029065 A1* | 1/2019 | Park | H04W 76/18 |
| 2019/0150081 A1* | 5/2019 | Qiao | H04W 60/00 370/329 |

FOREIGN PATENT DOCUMENTS

| | | |
|---|---|---|
| EP | 3442281 A1 | 2/2019 |
| WO | WO 2017/175715 A1 | 10/2017 |

OTHER PUBLICATIONS

Ericsson, "Slice co-existence," 3GPP draft; S2-175271_WAS5047_WAS4201_Slicing_NSSAI-Co Existence+Patrice, $3^{rd}$ Generation Partnership Project, Mobile Competence Centre, 650, Route des Lucioles, F-06921 Sophia-Antipolis Cedex, vol. SA WG2, no. Mexico, 20170626-20170630, Jul. 3, 2017, XP051310241.

(Continued)

*Primary Examiner* — Ted M Wang
(74) *Attorney, Agent, or Firm* — Leydig, Voit & Mayer, Ltd.

(57) ABSTRACT

A method is performed by a user equipment (UE). The method includes transmitting, to a network, a message for registration of the UE. The message comprises information related to one or more network slices that are not compatible with at least one allowed network slice.

13 Claims, 8 Drawing Sheets

(56) References Cited

OTHER PUBLICATIONS

Qualcomm Incorporated, "TS 23.501—Proposal for co-existence of network slices stemming from offline discussion," 3GPP draft, S2-174442_TS 23.501 Slice Co-Existence, 3rd Generation Partnership Project, Mobile Competence Centre, 650, Route des Lucioles, F-06921 Sophia-Antipolis Cedex, France, vol. SA WG2, no. San Jose del Cabo, Mexico, 20170626-20170630, Jun. 25, 2017, XP051303293.
Samsung et al. "TS 23.501: isolated/dedicated slices," 3GPP draft, S2-171889 Isolated Slices, $3^{rd}$ Generation Partnership Project, Mobile Competence Centre, 650, Route des Lucioles, F-06921 Sophia-Antipolis Cedex, France, vol. SA WG2, no. Busan, South Korea, 20170327-20170331, Mar. 26, 2017, XP051248034.
Qualcomm Incorporated, "TS 23.501: Network Triggered change of slices for UE," 3GPP draft, S2-175766_TS 23.501 NW Triggered Slice Change, $3^{rd}$ Generation Partnership Project, Mobile Competence Centre, 650, Route des Lucioles, F-06921 Sophia-Antipolis Cedex, France, vol. SA WG2, no. Sophia-Antipolis, France, 20170821-20170825, Aug. 21, 2017, XP051325614.
Ericsson, "NSSF and Slice selection during the Registration procedures," 3GPP draft, S2-173352 Reg Proc Corr Incl NSSF, $3^{rd}$ Generation Partnership Project, Mobile Competence Centre, 650, Route des Lucioles, F-06921 Sophia-Antipolis Cedex, France, vol. SA WG2, no. Hangzhou, 20170515-20170519, May 14, 2017, XP051281847.

* cited by examiner

ISOLATED NETWORK SLICE SELECTION

CROSS-REFERENCE TO PRIOR APPLICATIONS

This application is a U.S. National Phase application under 35 U.S.C. § 371 of International Application No. PCT/EP2019/057798, filed on Mar. 27, 2019, and claims benefit to European Patent Application No. EP 18164393.3, filed on Mar. 27, 2018. The International Application was published in English on Oct. 3, 2019 as WO 2019/185758 A1 under PCT Article 21(2).

FIELD

The present invention relates to a communication system. The invention has, for example, relevance to wireless communication systems and devices thereof operating according to the 3rd Generation Partnership Project (3GPP) standards or equivalents or derivatives thereof.

BACKGROUND

The 3rd Generation Partnership Project (3GPP) has been working on a system architecture for the next generation (5G) mobile networks. One of the main key issues is to allow for Network Slicing that enables the operators to create networks customized to provide optimized solutions for different market scenarios which demands diverse requirements.

The following Network Slicing definitions and principles have been agreed in Technical Specification (TS) 23.501 V15.0.0 (listed in non-alphabetical order):

S-NSSAI—An S-NSSAI (Single Network Slice Selection Assistance information) identifies a Network Slice.
S-NSSAI is comprised of:
  A Slice/Service type (SST), which refers to the expected Network Slice behaviour in terms of features and services;
  A Slice Differentiator (SD). which is optional information that complements the Slice/Service type(s) to allow further differentiation for selecting an Network Slice instance from the potentially multiple Network Slice instances that all comply with the indicated Slice/Service type. This information is referred to as SD.
S-NSSAI scope—The S-NSSAI can have standard values or public land mobile network (PLMN)-specific values. S-NSSAIs with PLMN-specific values are associated to the PLMN ID of PLMN that assigns it. An S-NSSAI shall not be used by the user equipment (UE) in access stratum procedures in any PLMN other than the one to which the S-NSSAI is associated.
NSSAI—The Network Slice Selection Assistance Information is a collection of S-NSSAIs.
Allowed NSSAI—an NSSAI provided by the serving PLMN during e.g. a registration procedure, indicating the NSSAI allowed by the network for the user equipment (UE) in the serving PLMN for the current registration area. For each PLMN, the UE shall store the Configured NSSAI and, if any, the Allowed NSSAI. When the UE receives an Allowed NSSAI for a PLMN, it shall store it and override any previously stored Allowed NSSAI for this PLMN.
Configured NSSAI—an NSSAI that has been provisioned in the UE. A UE can be configured by the home PLMN (HPLMN) with a Configured NSSAI per PLMN. A Configured NSSAI can be PLMN-specific and the HPLMN indicates to what PLMN(s) each Configured NSSAI applies, including whether the Configured NSSAI applies to all PLMNs, i. e. the Configured NSSAI conveys the same information regardless of the PLMN the UE is accessing (e.g. this could be possible for NSSAIs containing only standardized S-NSSAIs).
Requested NSSAI—may be either:
  the Configured-NSSAI, or a subset thereof as described below, if the UE has no Allowed NSSAI for the current PLMN; or
  the Allowed-NSSAI, or a subset thereof as described below, if the UE has an Allowed NSSAI for the current PLMN, or
  the Allowed-NSSAI, or a subset thereof as described below, plus one or more S-NSSAIs from the Configured-NSSAI for which no corresponding S-NSSAI is present in the Allowed NSSAI and that were not previously permanently rejected (as defined below) by the network for the present tracking area.
Network Slice—A logical network that provides specific network capabilities and network characteristics.
Network Slice instance—A set of Network Function instances and the required resources (e.g. compute, storage and networking resources) which form a deployed Network Slice.
NSSP—Network Slice Selection Policy. The network operator may provision the UE with NSSP. The NSSP includes one or more NSSP rules each one associating an application with a certain S-NSSAI.
Initial Registration—UE registration in RM-DEREGISTERED state.

The current state of the art (TS 23.501) is that when a UE registers with a PLMN, if for this PLMN the UE has not included a Requested NSSAI, the RAN shall route all NAS signalling from/to this UE to/from a default AMF. When receiving from the UE a Requested NSSAI and a 5G-serving temporary mobile subscriber identity (S-TMSI) in radio resource control (RRC), if the radio access network (RAN) can reach an access and mobility management function (AMF) corresponding to the 5G-S-TMSI, then RAN forwards the request to this AMF. Otherwise, the RAN selects a suitable AMF based on the Requested NSSAI provided by the UE and forwards the request to the selected AMF. If the RAN is not able to select an AMF based on the Requested NSSAI, then the request is sent to a default AMF.

3GPP SA2 completed successfully the work on 5G phase 1 with some outstanding issue on Network Slicing. One of the outstanding issues on the Network Slicing is isolated networks slices—how to isolate a network slice and how to select an isolated network slice. Now 3GPP SA2 is about to start work on a new Study Item S2-182 913 'Study on Network Slicing Phase-2' which was agreed at SA2 #126 February 2018 where one of the objectives is:
  Identify, prioritize and study the practical non-roaming and roaming deployment scenarios and system impacts when the 5GS is not able to support all possible combination of S-NSSAIs for the UE, and the isolation aspects among Network Slices.

Currently, there is the following assumption below made in Rel-15 on network slicing:
TS 23.501, 5.15 Network slicing
NOTE: In this release of the specification it is assumed that in any (home or visited) PLMN it is always possible to select an AMF that can serve any combination of S-NSSAIs that will be provided as an Allowed NSSAI.

As one of the attributes of the 'isolated network slices' is that they will be served by dedicated AMF in order to isolate them from the rest of network slices, the above Note is applicable for isolated network slices as well, i.e. the deployment of isolated network slices would create co-existence issue. So, it is an open issue how to handle the isolated network slices when they co-exist with other network slices that are not isolated.

SUMMARY

An embodiment of the present invention provides a method that is performed by a user equipment (UE). The method includes transmitting, to a network, a message for registration of the UE. The message comprises information related to one or more network slices that are not compatible with at least one allowed network slice.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
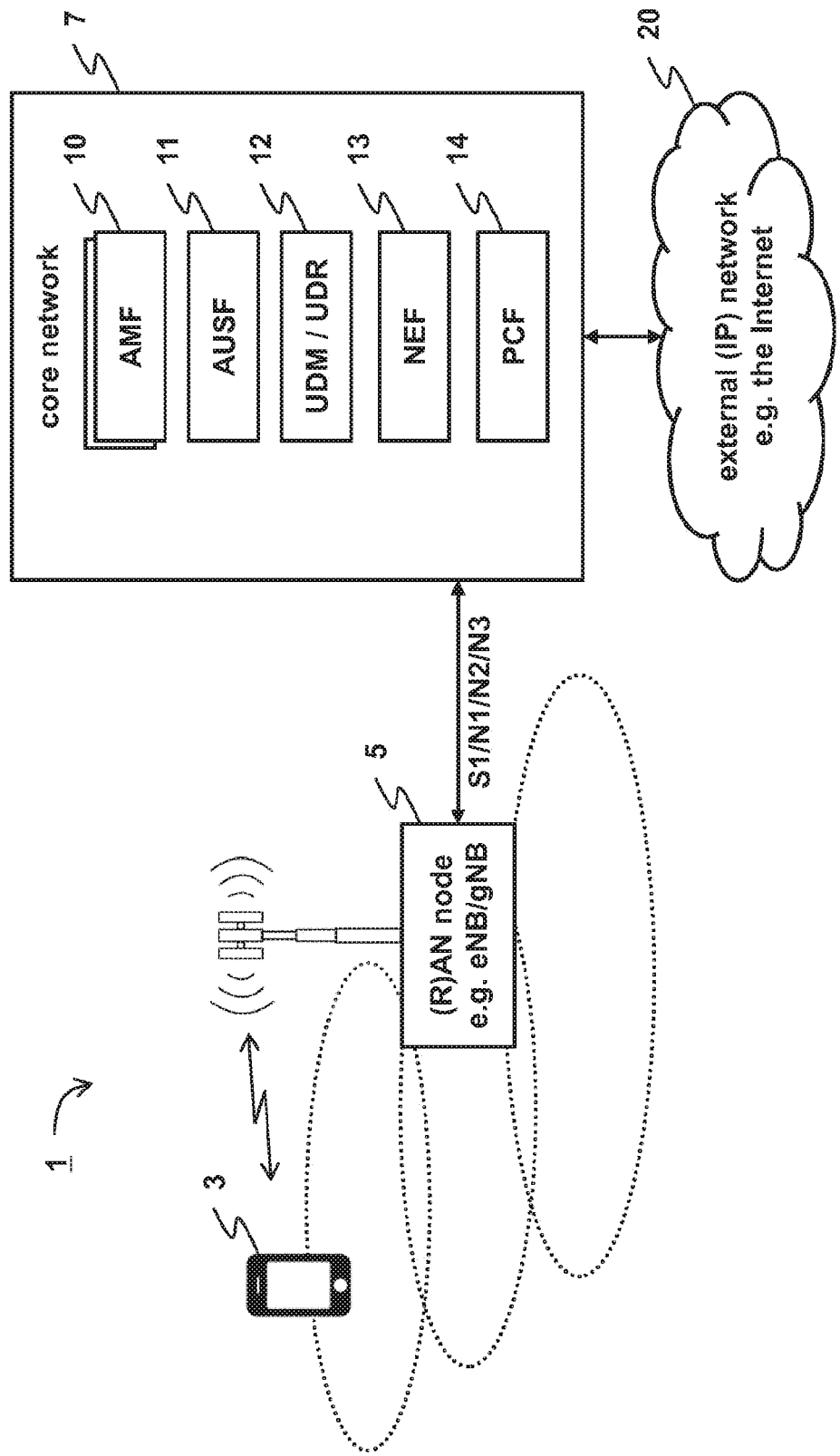
FIG. 1 schematically illustrates a mobile (cellular or wireless) telecommunication system to which the described embodiments are applicable.

Embodiments of the present invention provide methods and associated apparatus that address or at least alleviate (at least some of) the above described issues.

Although for efficiency of understanding for those of skill in the art, embodiments of the present invention will be described in detail in the context of a 3GPP system (5G networks), the principles of embodiments of the invention can be applied to other systems as well. That is, embodiments of the invention have particular but not exclusive relevance to wireless communication systems and devices thereof operating according to the 3rd Generation Partnership Project (3GPP) standards or equivalents or derivatives thereof. The embodiments of the invention have particular although not exclusive relevance to network slice selection in the so-called '5G' (or 'Next Generation') systems.

In one aspect, an embodiment of the invention provides a method performed by a user equipment (UE), the method comprising: transmitting, to a network, a message for registration of the UE; wherein the message includes information related to one or more network slices that is/are not compatible with at least one allowed network slice.

In another aspect, an embodiment of the invention provides a method performed by an access and mobility management function (AMF), the method comprising: receiving, via a base station, a message for registration of a user equipment (UE); wherein the message includes information related to one or more network slices that is/are not compatible with at least one allowed network slice.

In one aspect, an embodiment of the invention provides a user equipment (UE) comprising: means for transmitting, to a network, a message for registration of the UE; wherein the message includes information related to one or more network slices that is/are not compatible with at least one allowed network slice.

In one aspect, an embodiment of the invention provides an access and mobility management function (AMF) comprising: means for receiving, via a base station, a message for registration of a user equipment (UE); wherein the message includes information related to one or more network slices that is/are not compatible with at least one allowed network slice.

In another aspect, an embodiment of the invention provides a user equipment (UE) comprising: a controller and a transceiver, wherein the controller is configured to control the transceiver to transmit, to a network, a message for registration of the UE; wherein the message includes information related to one or more network slices that is/are not compatible with at least one allowed network slice.

In another aspect, an embodiment of the invention provides an access and mobility management function (AMF) comprising: a controller and a transceiver, wherein the controller is configured to control the transceiver to receive, via a base station, a message for registration of a user equipment (UE); wherein the message includes information related to one or more network slices that is/are not compatible with at least one allowed network slice.

Aspects of the invention extend to corresponding systems, and computer program products such as computer readable storage media having instructions stored thereon, which are operable to program a programmable processor to carry out a method as described in the aspects and possibilities set out herein and/or to program a suitably adapted computer to provide a corresponding apparatus.

Each feature described herein and/or shown in the drawings may be incorporated in the invention independently of (or in combination with) any other disclosed and/or illustrated features. In particular, but without limitation, the features of any of the claims dependent from a particular independent claim may be introduced into that independent claim in any combination or individually.

The invention will now be described, by way of example only, with reference to the accompanying drawings.

Under the 3GPP standards, a NodeB (or an 'eNB' in LTE, 'gNB' in 5G) is a base station via which communication devices (user equipment or 'UE') connect to a core network and communicate to other communication devices or remote servers. Communication devices might be, for example, mobile communication devices such as mobile telephones, smartphones, smart watches, personal digital assistants, laptop/tablet computers, web browsers, e-book readers, and/or the like. Such mobile (or even generally stationary) devices are typically operated by a user (and hence they are often collectively referred to as user equipment, 'UE') although it is also possible to connect IoT devices and similar MTC devices to the network. For simplicity, the present application will use the term base station to refer to any such base stations (or (R)AN node) and use the term mobile device or UE to refer to any such communication device.

FIG. 1 illustrates schematically a mobile (cellular or wireless) telecommunication system 1 to which embodiments of the invention may be applied.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions and user plane functions. In this example, the core network 7 includes, amongst others, one or more Access and Mobility Functions (AMFs) 10 (including for example a default AMF 10D), an Authentication Server Function (AUSF) 11, a Unified Data Management/Unified Data Repository (UDM/UDR) 12, a Network Exposure Function (NEF) 13, and a Policy Control Function (PCF) 14. From the core network 7, connection to an external IP network 20 (such as the Internet) is also provided.

The components of this system 1 are configured to perform one or more of the following:

an isolated network slice selection procedure at registration;
an isolated network slice selection procedure via AMF re-routing before authentication;
an isolated network slice selection procedure via AMF re-routing after authentication; and
an isolated network slice update procedure.

In a particularly beneficial example, the UE 3 indicates network slice(s) that are not compatible with the rest of the network slices during the registration procedure. For example, the UE 3 may indicate such non-compatible network slices to the AMF 10 using a 'Requested NSSAI' parameter/'Requested isolated NSSAI' parameter (and/or the like) in a 'Registration Request' message sent to the AMF 10. The UE 3 may be configured to maintain a separate record (from the rest of the network slices) for the network slices that are not compatible with the rest of network slices (i.e. isolated or mutually exclusive network slices).

User Equipment (UE)

Figure 2:
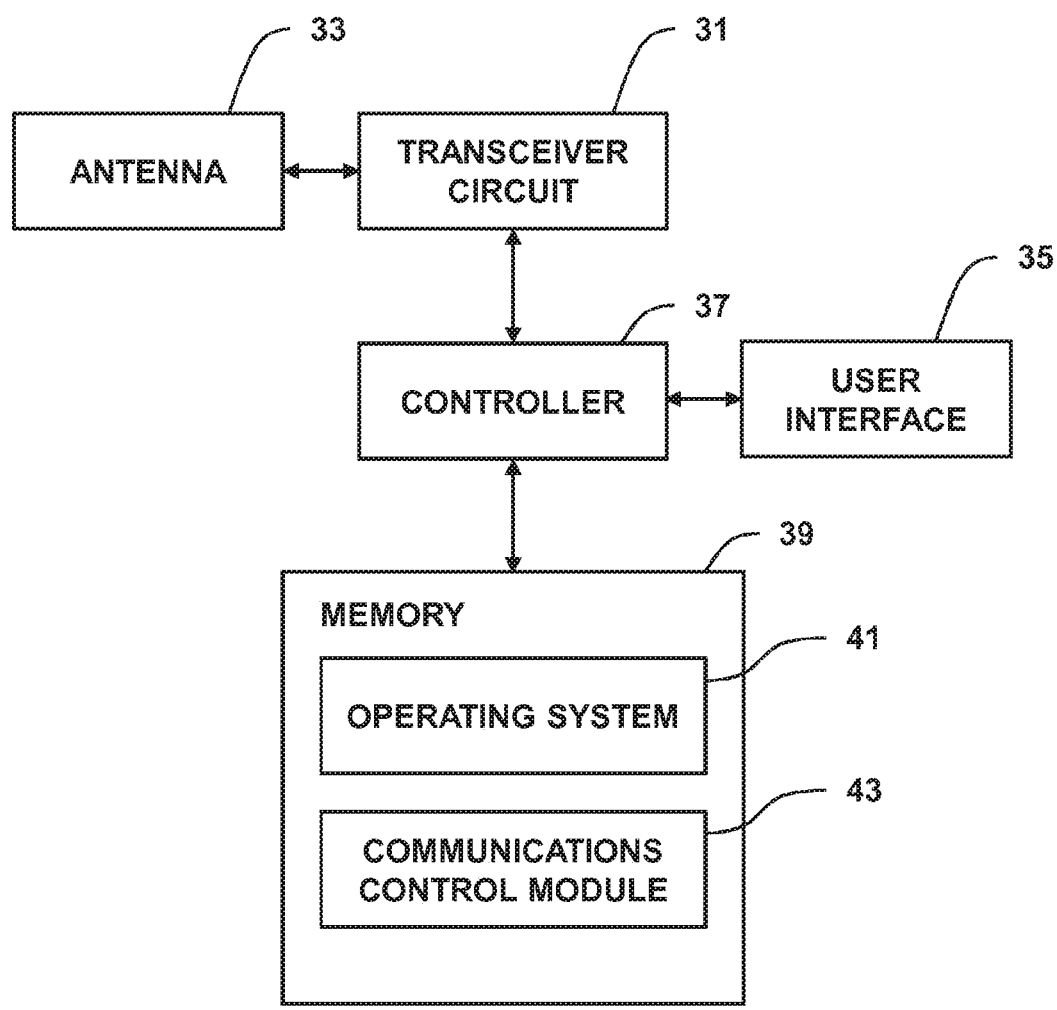
FIG. 2 is a block diagram illustrating the main components of the UE shown in FIG. 1.

FIG. 2 is a block diagram illustrating components of the UE (mobile device 3) shown in FIG. 1. As shown, the UE includes a transceiver circuit 31, which is operable to transmit signals to and to receive signals from the connected node(s) via one or more antenna 33. The UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5 and core network nodes.

(R)AN Node

Figure 3:
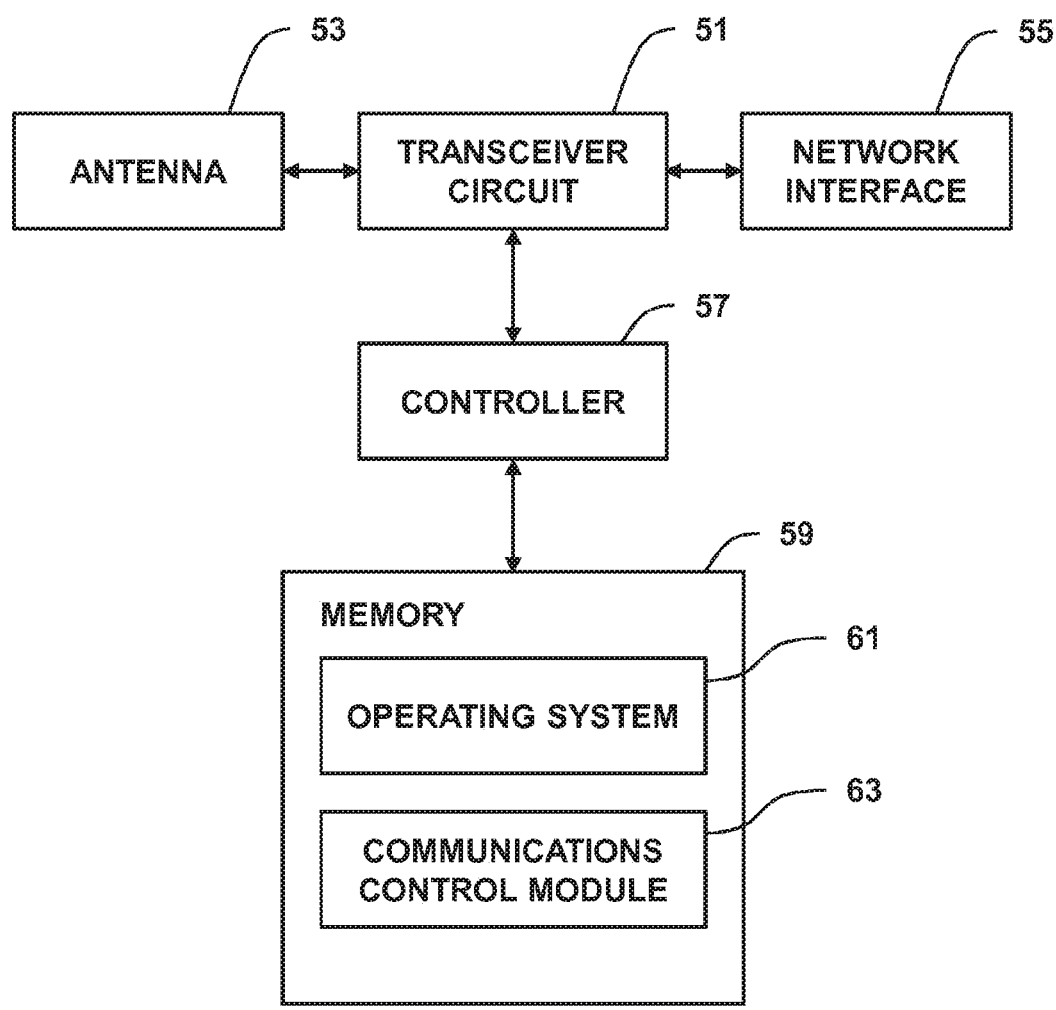
FIG. 3 is a block diagram illustrating the main components of an exemplary (R)AN node shown in FIG. 1.

FIG. 3 is a block diagram illustrating components of an exemplary (R)AN node 5 (base station) shown in FIG. 1. As shown, the (R)AN node 5 includes a transceiver circuit 51, which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes. The communications control module 63 is also responsible for communicating data packets for each UE using a network slice that is appropriate for that UE 3.

Core Network Node

Figure 4:
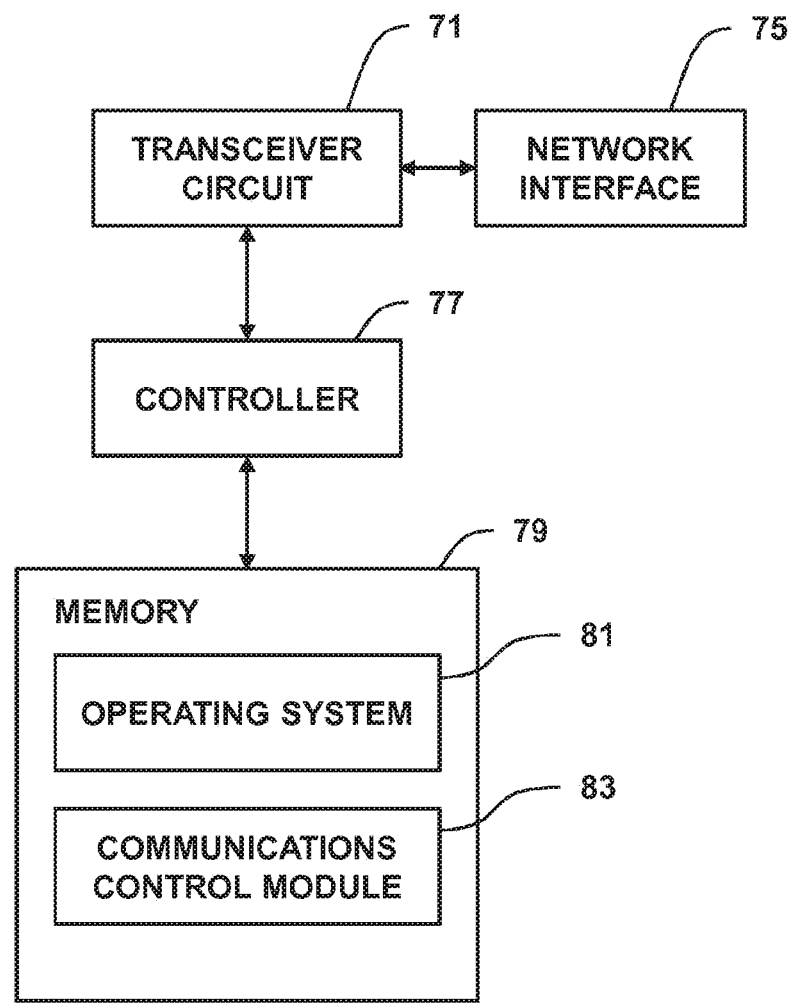
FIG. 4 is a block diagram illustrating the main components of a generic core network node shown in FIG. 1.

FIG. 4 is a block diagram illustrating components of a generic core network node (or function), for example, the AMF 10, the AUSF 11, the UDM/UDR 12, the NEF 13, or the PCF 14 shown in FIG. 1. As shown, the core network node includes a transceiver circuit 71, which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and a communications control module 83. The communications control module 83 is responsible for handling (generating/sending/receiving) signalling between the core network node and other nodes, such as the UE 3, (R)AN node 5, and other core network nodes. Such signalling includes appropriately formatted requests and responses relating to network slice selection.

Exemplary Embodiment 1—Isolated Network Slice Selection at Registration

Exemplary Embodiment 1 addresses how to select an isolated network slice at registration. It provides a new parameter: 'requested isolated NSSAI' (or requested isolated S-NSSAI or any other annotation for the parameter used for the purpose of a request or preference or priority by the UE to attach for an isolated network slice during the registration procedure), see FIG. 5. The procedure in FIG. 5 considers both use cases:
  where the required isolated network slice is available (use case A); and
  where the required isolated network slice is not available (use case B).

A basic principle assumption in this exemplary embodiment is that requested isolated NSSAI is an NSSAI (which may contain one or more isolated S-NSSAIs) that requires mapping to an isolated network slice (or slice instance) which is likely to be supported by a dedicated network resources like dedicated AMF for example. This dedicated AMF may or may not support network slices other than the isolated network slice(s).

Figure 5:
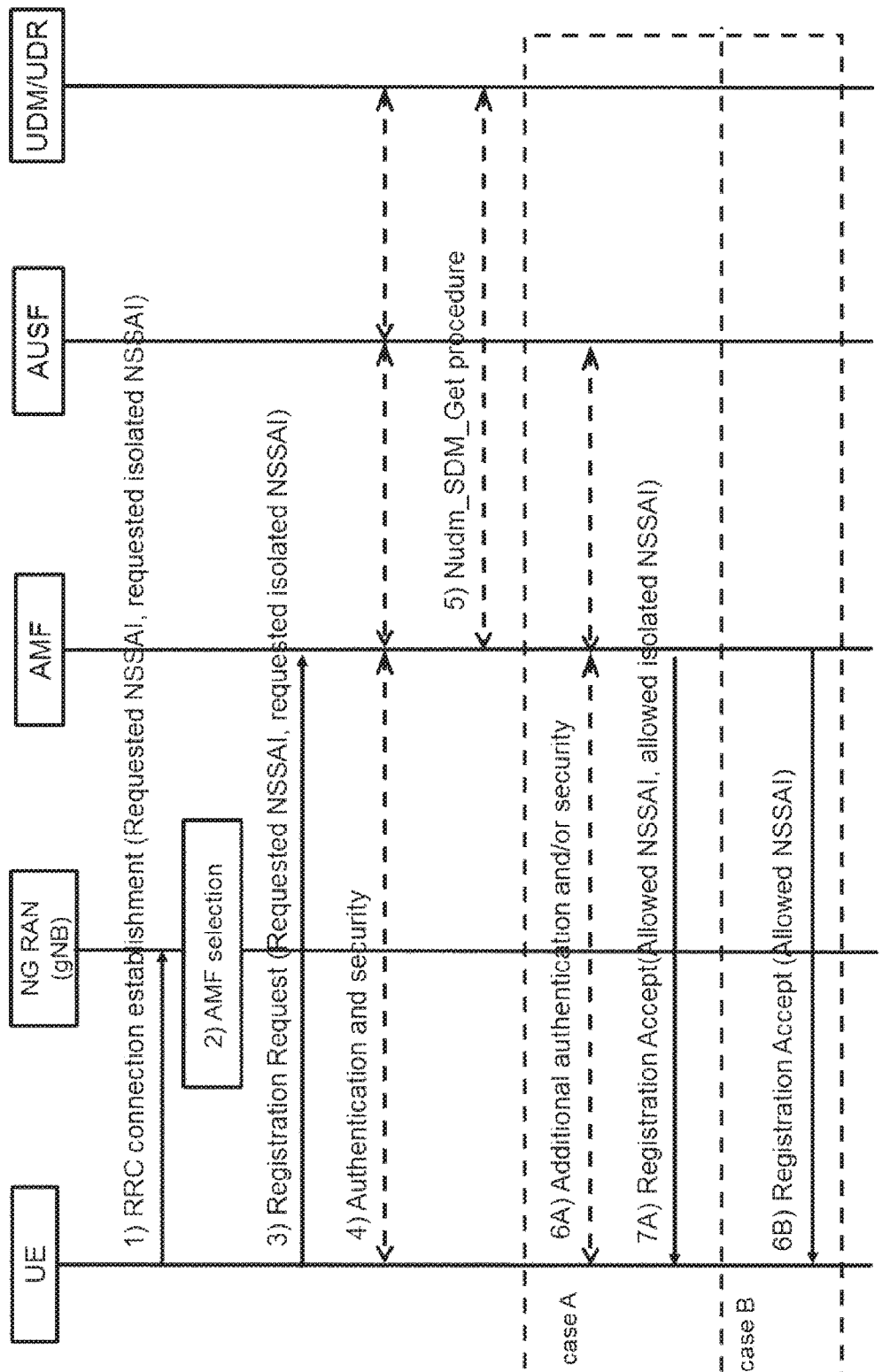
FIG. 5 is a schematic signalling (timing) diagram illustrating an exemplary procedure for isolated network slice selection at registration.

FIG. 5 illustrates schematically an exemplary procedure for isolated network slice selection at registration.

1) The UE initiates RRC connection procedure. If the UE has an allowed isolated NSSAI, the UE indicates in the RRC Connection Establishment Request message or in the RRC Connection Setup Complete message or in any other RRC signalling an 'requested isolated NSSAI' parameter (which may contain one or more isolated S-NSSAIs) along with the Requested NSSAI parameter if the UE has allowed or configured S-NSSAIs other than the isolated S-NSSAI(s).

2) If requested isolated NSSAI parameter is present in the RRC signalling (which has a priority over the Requested NSSAI), the gNB select an AMF based on the isolated NSSAI(s) i.e. an AMF that supports the isolated S-NSSAI(s) within the requested isolated NSSAI. Otherwise, the gNB selects an AMF based on the requested NSSAI, if any, i.e. an AMF that supports the S-NSSAIs within the requested NSSAI or a default AMF if the requested isolated NSSAI parameter and Requested NSSAI parameter are missing or there is no AMF that supports them.

3) The UE initiates Registration Request message to the AMF and includes the Requested NSSAI (if any) and the requested isolated NSSAI.

4) AUSF executes authentication of the UE. If the selected AMF supports isolated network slice(s) to which the requested isolated NSSAI from the UE maps (i.e. the AMF was selected based on the requested isolated NSSAI from the UE), the AUS may execute more sophisticated authentication and security procedures.

5) AMF may retrieve the Access and Mobility subscription data using Nudm_SDM_Get. This requires that UDM may retrieve this information from UDR by Nudr_UDM_Query (Access and Mobility Subscription data). After a successful response is received, the AMF subscribes to be notified using Nudm_SDM_Subscribe when the data requested is modified, UDM may subscribe to UDR by Nudr_UDM_Subscribe. The AMF creates an MM context for the UE after getting the mobility subscription data from the UDM. The AMF may verify whether the user has a valid subscription in the UDM for the isolated network slice.

6A) If the selected AMF supports an isolated network slice i.e. the AMF was selected based on the requested isolated NSSAI, the AUS may execute additional authentication and or security checks for the UE.

7A) The AMF returns Registration Accept message to the UE in which the AMF includes the 'allowed isolated NSSAI' parameter (or any other name for a parameter for the purpose of indication the isolated NSSAI (or S-NSSAI) that is allowed for the UE). This is the requested isolated NSSAI based on which the AMF has been selected. This requested isolated NSSAI now is returned as an 'allowed isolated NSSAI'. The AMF may also return the 'Allowed NSSAI' parameter if the selected AMF serves both, isolated network slice(s) and non-isolated (normal) network slice(s).

If the AMF returned the 'allowed isolated NSSAI' parameter only i.e. the AMF supports only isolated network slice(s), the UE resets any existing Allowed NSSAI and the UE considers allowed only the S-NSSAI(s) returned within the allowed isolated NSSAI. When registering or re-registering the UE now shall use the 'requested isolated NSSAI' parameter which is based on the 'allowed isolated NSSAI', When the UE initiate Service Request or PDU session establishments, the UE may use any S-NSSAI from allowed isolated NSSAI.

If the AMF returned the 'allowed isolated NSSAI' parameter and the 'Allowed NSSAI' parameter i.e. the selected AMF supports isolated network slice(s) and also non-isolated network slice(s), the UE now will have to sets of allowed NSSAI(s), the conventional Allowed NSSAI and the allowed isolated NSSAI. When registering or re-registering the UE shall use both, Requested NSSAI (which is based on the Allowed NSSAI and Configured NSSAI) and the 'requested isolated NSSAI' which is based on the 'allowed isolated NSSAI', When the UE initiate Service Request or PDU session establishments, the UE may use any S-NSSAI from the Allowed NSSAI or from the allowed isolated NSSAI.

6B) If the selected AMF does not support isolated network slice(s) i.e. the AMF was selected based on the Requested NSSAI, the AMF returns Registration Accept message with an Allowed NSSAI parameter only. The Allowed NSSAI may also include the S-NSSAI from the requested isolated NSSAI (if any) or from the UE's subscription if the selected AMF serves that S-NSSAI however, the serving network slice would not be an isolated slice and would not be treated as such by the UE or the network.

Exemplary Embodiment 2—Isolated Network Slice Selection Via AMF Re-Routing Before Authentication Embodiment 2 addresses how to select an isolated network slice(s) via AMF re-routing. It provides first selection of a default AMF and then re-routing to an AMF that supports the isolated network slice(s), see FIG. 6. The procedure in FIG. 6 considers the use case where:
  either the UE did not provide the requested isolated NSSAI parameter in the RRC signalling (for configuration or UE/network policy reasons) that is needed for the right AMF selection by the NG-RAN Node;
  or the UE provided the requested isolated NSSAI parameter in the RRC signalling however the NG-RAN Node did not have the information needed to select an AMF that supports the requested isolated NSSAI.

In both cases the NG-RAN Node selects a default AMF.

Figure 6:
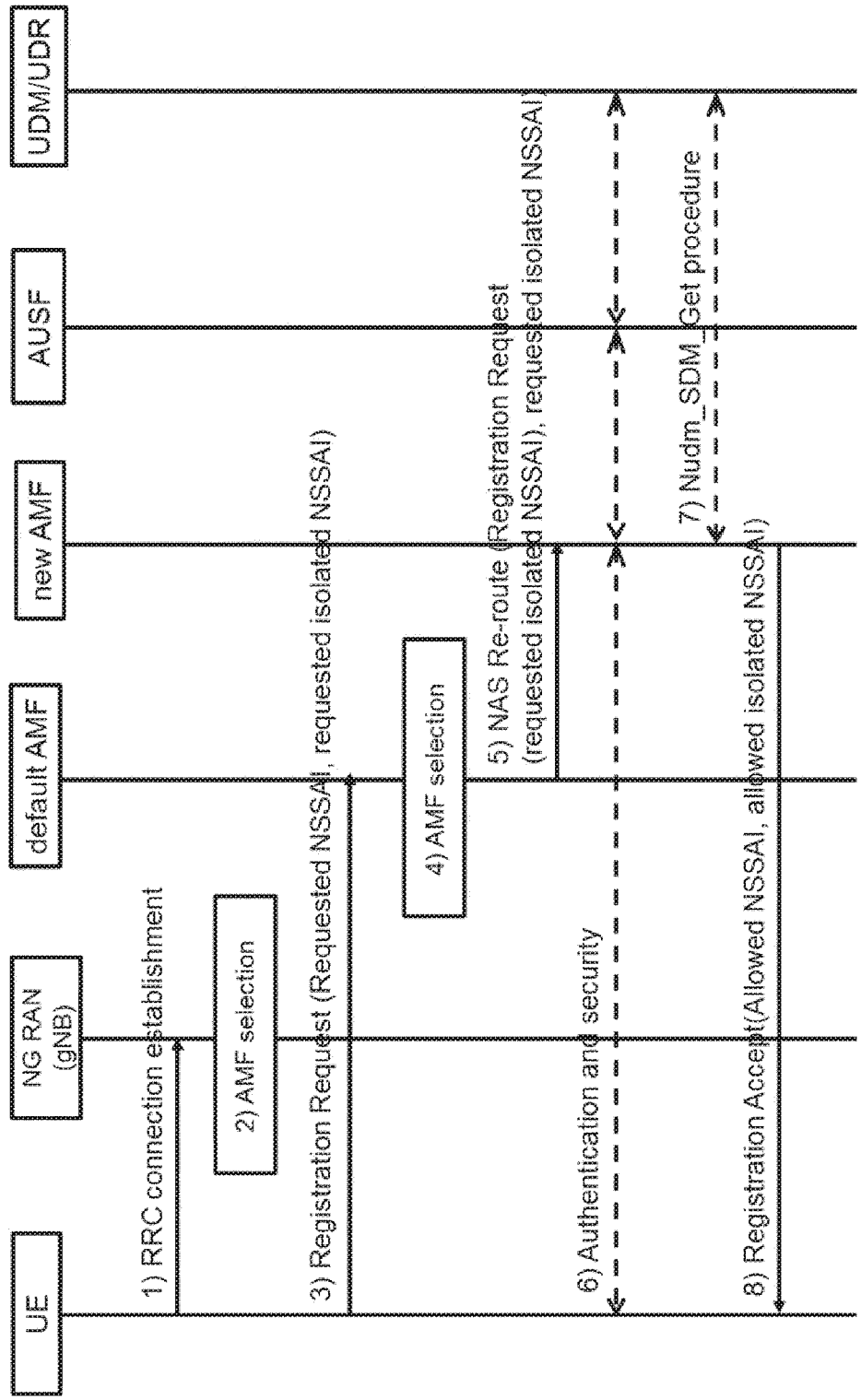
FIG. 6 is a schematic signalling (timing) diagram illustrating an exemplary procedure for isolated network slice selection via AMF re-routing before authentication.

FIG. 6 illustrates schematically an exemplary procedure for isolated network slice selection via AMF re-routing before authentication.

1) The UE initiates RRC connection establishment procedure. The requested isolated NSSAI is not included in the RRC signalling, neither in the RRC Connection establishment request message nor in the RRC connection Setup Complete message.
2) If no Requested NSSAI and no requested isolated NSSAI is present in the RRC signalling, the gNB selects a default AMF.
    Note: If only the Requested NSSAI is present in the RRC signalling, the gNB may select an AMF based on the Requested NSSAI (i.e. which would be not the default AMF but we can call it initial AMF) however, that still would not be the AMF that supports the required isolated network slice. In both cases an AMF re-routing to an AMF that supports the requested isolated NSSAI would follow. That is why we here consider the re-routing from the default or initial AMF only which is applicable for rerouting from any other AMF. Further in this proposal we use default AMF however, it should be noted that it is not always the case as in some cases it would be a non-default AMF which we call initial AMF.
3) The UE initiates Registration Request message to the default AMF and includes the requested isolated NSSAI.
4) If the default AMF does not support the requested isolated NSSAI (as expected), the default AMF may inquiry with the NSSF (e.g. by sending Nnssf_NS_Selection_Get service operation including the requested isolated NSSAI). The NSSF may return the target AMF that supports the requested isolated NSSAI (e.g. in Nnssf_NSSelection Response service). The default AMF may further interact with NRF to find out which AMF is dedicated (i.e. support) for the requested isolated NSSAI.
5) If the default AMF finds an AMF (new AMF) that supports the requested isolated NSSAI, the default AMF re-routes the Registration Request message to the new AMF via NAS Re-route message. The re-route may be directly to the new AMF via NAS Re-route message (e.g. the initial AMF invokes the Namf_Communication_N1MessageNotify to the target AMF, carrying the rerouted NAS message) or re-route via the gNB (e.g. the default AMF sends NAS Reroute message to the gNB. The NAS Re-route message includes the information about the target AMF and the Registration Request message carried). The default AMF may include the requested isolated NSSAI as a parameter in the NAS Re-route message as well in addition to having it in the Registration Request message.
6) AUSF executes authentication of UE. As the selected new AMF supports requested isolated network slice, the AUS may execute more sophisticated or additional level of authentication and security procedure.
7) The new AMF may retrieve the Access and Mobility subscription data using Nudm_SDM_Get. This requires that UDM may retrieve this information from UDR by Nudr_UDM_Query (Access and Mobility Subscription data). After a successful response is received, the AMF subscribes to be notified using Nudm_SDM_Subscribe when the data requested is modified, UDM may subscribe to UDR by Nudr_UDM_Subscribe. The new AMF creates an MM context for the UE after getting the mobility subscription data from the UDM. The new AMF may verify whether the user has a valid subscription for the isolated network slice.
8) The new AMF returns Registration Accept message to the UE in which the new AMF includes the 'allowed isolated NSSAI' parameter (or any other name for a parameter for the purpose of indication the isolated NSSAI (or S-NSSAI) that is allowed for the UE). This is the requested isolated NSSAI based on which the new AMF has been selected. This requested isolated NSSAI now is returned as an 'allowed isolated NSSAI'. The new AMF may also return the 'Allowed NSSAI' parameter if the selected new AMF supports both, isolated network slice(s) and non-isolated (normal) network slice(s).

If the new AMF returned the 'allowed isolated NSSAI' parameter only i.e. the new AMF supports only isolated network slice(s), the UE resets any existing Allowed NSSAI and the UE considers allowed only the S-NSSAI(s) returned within the allowed isolated NSSAI. When registering or re-registering the UE now shall use the 'requested isolated NSSAI' parameter which is based on the 'allowed isolated NSSAI', When the UE initiate Service Request or PDU session establishments, the UE may use any S-NSSAI from allowed isolated NSSAI.

If the new AMF returned the 'allowed isolated NSSAI' parameter and the 'Allowed NSSAI' parameter i.e. the selected new AMF supports isolated network slice(s) and also non-isolated network slice(s), the UE now will have to sets of allowed NSSAI(s), the conventional Allowed NSSAI and the allowed isolated NSSAI. When registering or re-registering the UE shall use both, Requested NSSAI (which is based on the Allowed NSSAI and Configured NSSAI) and the 'requested isolated NSSAI' which is based on the 'allowed isolated NSSAI', When the UE initiate Service Request or PDU session establishments, the UE may use any S-NSSAI from the Allowed NSSAI or from the allowed isolated NSSAI.

Exemplary Embodiment 3—Isolated Network Slice Selection Via AMF Re-Routing after Authentication Embodiment 3 addresses how to select an isolated network slice via AMF re-routing after UE authentication with the default AMF. It proposes the UE firstly connects to a default AMF and authenticate with it. Then the isolated NSSAI is received from the UE during the security procedure, within the Security Mode Command Complete message, for example. The aim is to avoid including the isolated NSSAI in an unencrypted RRC message and/or unencrypted NAS message (e.g. in the initial registration request) for privacy reasons. Based on the received requested isolated NSSAI within the Security Mode Command Complete message the default AMF finds out the new AMF that supports the isolated network slice and re-routes the Registration Request message and the requested isolated NSSAI to the new AMF, see FIG. 7.

Figure 7:
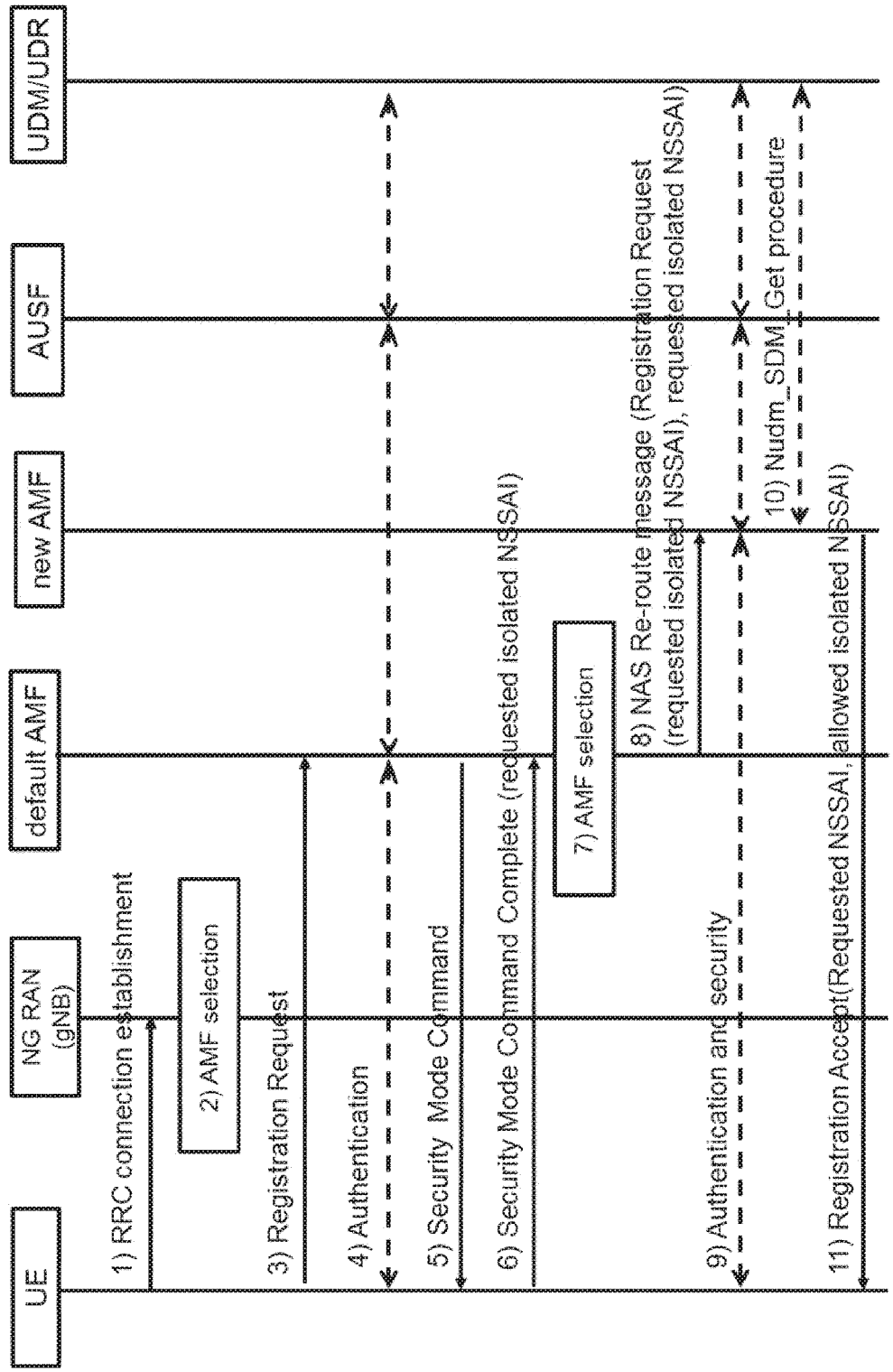
FIG. 7 is a schematic signalling (timing) diagram illustrating an exemplary procedure for isolated network slice selection via AMF re-routing after authentication.

FIG. 7 illustrates schematically an exemplary procedure for isolated network slice selection via AMF re-routing after authentication.

1) The UE initiates RRC connection procedure. If the UE has an allowed isolated S-NSSAI and prefers to connect to an isolated Network Slice, the UE does not indicate in the RRC signalling, neither in the RRC Connection Establishment Request message nor in the RRC Connection Setup Complete message the isolated NSSAI.

2) If no requested NSSAI and no requested isolated NSSAI is present in the RRC signalling, the gNB select a default AMF.
   Note: If only the Requested NSSAI is present in the RRC signalling, the gNB may select an AMF based on the Requested NSSAI (i.e. not the default AMF) however, that still would not be the AMF that supports the required isolated network slice. In both cases an AMF re-routing to an AMF that supports the requested isolated NSSAI would follow. That is why we here consider the re-routing from the default AMF only which is applicable for rerouting from any other AMF.
3) The UE initiates Registration Request message to the default AMF. The UE still does not include the requested isolated NSSAI for privacy considerations, for example as the Initial Registration message is unencrypted.
4) AUSF executes authentication of the UE with the default AMF.
5) The default AMF triggers the security procedure by sending Security Mode Command message.
6) The UE responds to the Security Mode Command message with Security Mode Complete and includes in it the requested isolated NSSAI. In this case the requested isolated NSSAI is security protected as the Security Mode Complete. Message is encrypted.
7) The default AMF may interact with the NSSF and/or NRF to find out which AMF is dedicated (i.e. support) for the requested isolated NSSAI received in the Security Mode Complete message.
8) If the default AMF finds the AMF (new AMF) that supports the requested isolated NSSAI, the default AMF re-routes the Registration Request message and the requested isolated NSSAI to the new AMF. The reroute may be directly to the new AMF or rerouted via the gNB.
9) AUSF executes authentication security procedures with the UE. As the selected new AMF supports isolated network slice, the AUSF may execute more sophisticated authentication and security procedure.
10) The new AMF may retrieve the Access and Mobility subscription data using Nudm_SDM_Get. This requires that UDM may retrieve this information from UDR by Nudr_UDM_Query (Access and Mobility Subscription data). After a successful response is received, the AMF subscribes to be notified using Nudm_SDM_Subscribe when the data requested is modified, UDM may subscribe to UDR by Nudr_UDM_Subscribe. The new AMF creates an MM context for the UE after getting the mobility subscription data from the UDM. The new AMF may verify whether the user has a valid subscription for the requested isolated network slice.
11) The new AMF returns Registration Accept message to the UE in which the new AMF includes the 'allowed isolated NSSAI' parameter (or any other name for a parameter for the purpose of indication the isolated NSSAI (or S-NSSAI) that is allowed for the UE). This is the requested isolated NSSAI based on which the new AMF has been selected. This requested isolated NSSAI now is returned as an 'allowed isolated NSSAI'. The new AMF may also return the 'Allowed NSSAI' parameter if the selected new AMF supports both, isolated network slice(s) and non-isolated (normal) network slice(s).

If the new AMF returned the 'allowed isolated NSSAI' parameter only i.e. the new AMF supports only isolated network slice(s), the UE resets any existing Allowed NSSAI and the UE considers allowed only the S-NSSAI(s) returned within the allowed isolated NSSAI. When registering or re-registering the UE now shall use the 'requested isolated NSSAI' parameter which is based on the 'allowed isolated NSSAI', When the UE initiate Service Request or PDU session establishments, the UE may use any S-NSSAI from allowed isolated NSSAI.

If the new AMF returned the 'allowed isolated NSSAI' parameter and the 'Allowed NSSAI' parameter i.e. the selected new AMF supports isolated network slice(s) and also non-isolated network slice(s), the UE now will have to sets of allowed NSSAI(s), the conventional Allowed NSSAI and the allowed isolated NSSAI. When registering or re-registering the UE shall use both, Requested NSSAI (which is based on the Allowed NSSAI and Configured NSSAI) and the 'requested isolated NSSAI' which is based on the 'allowed isolated NSSAI', When the UE initiate Service Request or PDU session establishments, the UE may use any S-NSSAI from the Allowed NSSAI or from the allowed isolated NSSAI.

Exemplary Embodiment 4—Isolated Network Slice Update

Embodiment 4 addresses the use case where the isolated network slice changes, i.e. becomes available/unavailable between the registration procedures, subscription change or policy change or any other reason for change. In these cases the change in the isolated network slice could be relayed to the UE via the UE Configuration Update message, see FIG. 8.

Figure 8:
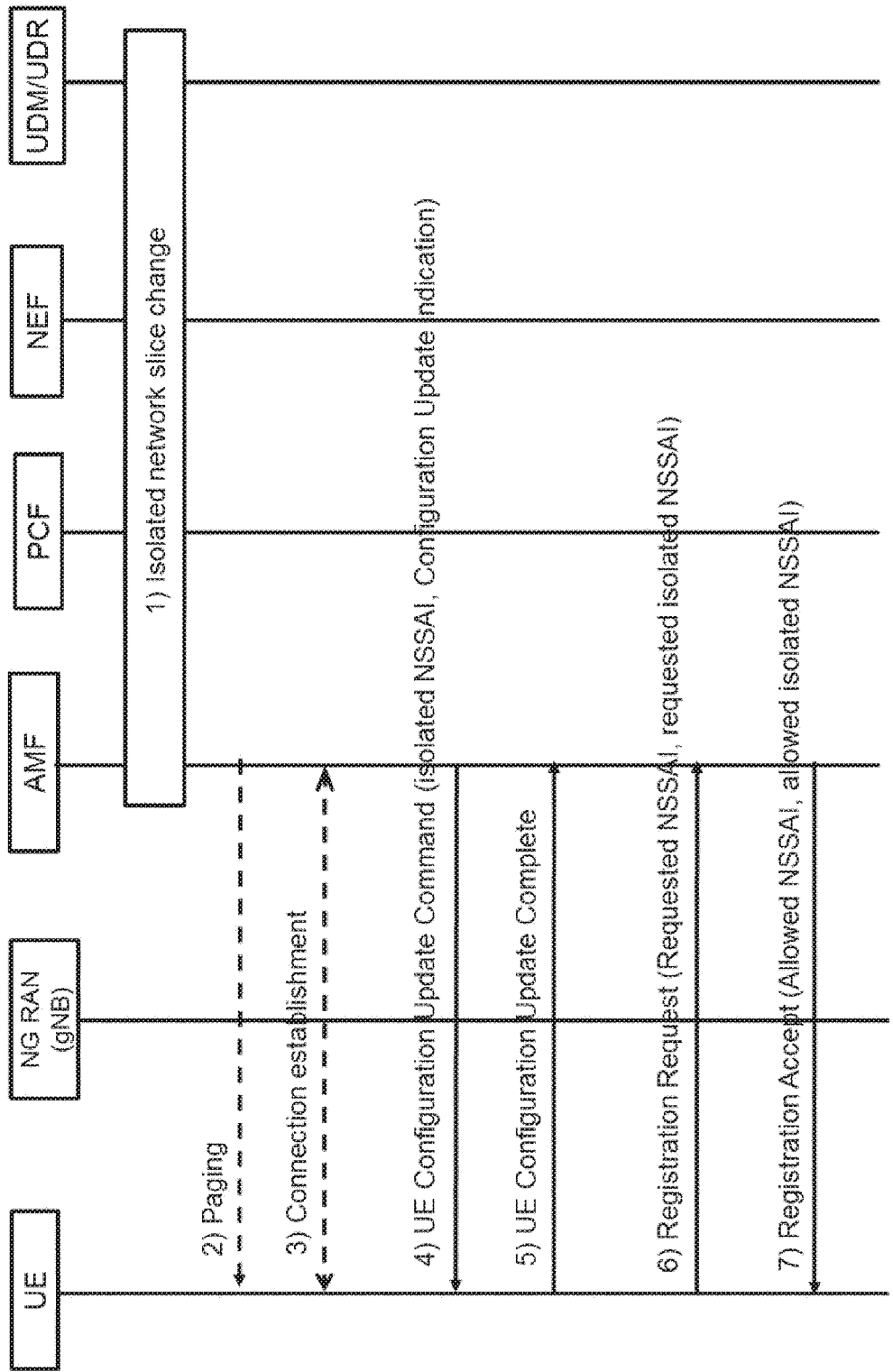
FIG. 8 is a schematic signalling (timing) diagram illustrating an exemplary procedure for isolated network slice update.

FIG. 8 illustrates schematically an exemplary procedure for isolated network slice update.
1) Isolated network slice change. Examples for isolated network slice change are: the isolated network slice that the UE is registered with is no longer available; the isolated network slice that the UE is subscribed to becomes available; subscription change of the isolated network slice; isolated network slice policy change and more.
2) Paging the UE. If the isolated network slice that the UE is subscribed or attached to changes and the UE is in idle mode (i.e. not connected to the network), the AMF pages the UE.
3) Connection establishment. The UE answers to the paging and connects to the AMF.
4) AMF triggers UE Configuration Update Command message to the UE in which message the AMF includes the change to the isolated NSSAI (e.g. isolated NSSAI=False (becomes unavailable), isolated NSSAI=True (becomes available) or the new updated isolated NSSAI itself, after subscription or policy change for example). The AMF also includes the Configuration Update indication in order to tell the UE that re-registration due to the change in the isolated NSSAI is needed.
5) The UE confirms the update in the isolated network slice with Configuration Update Complete message.
6) If the Configuration Update indication in the UE Configuration Update Command message required re-registration, the UE triggers Registration Request message.
   If the isolated NSSAI changed or become available The UE includes the updated isolated NSSAI in the Registration Request message within the requested isolated NSSAI parameter.
   If the isolated NSSAI becomes unavailable, the UE includes the Requested NSSAI (if any) in the Registration Request message.
7) The AMF returns Registration Accept message to the UE in which the AMF includes the 'allowed isolated NSSAI' parameter (or any other name for a parameter for the purpose of indication the isolated NSSAI (or S-NSSAI) that is allowed for the UE). This is the requested isolated NSSAI based on which the AMF has been selected. This requested isolated NSSAI now is returned as an 'allowed isolated NSSAI'. The AMF may also return the 'Allowed NSSAI' parameter if the selected AMF serves both, isolated network slice(s) and non-isolated (normal) network slice(s).

If the AMF returned the 'allowed isolated NSSAI' parameter only i.e. the AMF supports only isolated network slice(s), the UE resets any existing Allowed NSSAI and the UE considers allowed only the S-NSSAI(s) returned within the allowed isolated NSSAI. When registering or re-registering the UE now shall use the 'requested isolated NSSAI' parameter which is based on the 'allowed isolated NSSAI', When the UE initiate Service Request or PDU session establishments, the UE may use any S-NSSAI from allowed isolated NSSAI.

If the AMF returned the 'allowed isolated NSSAI' parameter and the 'Allowed NSSAI' parameter i.e. the selected AMF supports isolated network slice(s) and also non-isolated network slice(s), the UE now will have to sets of allowed NSSAI(s), the conventional Allowed NSSAI and the allowed isolated NSSAI. When registering or re-registering the UE shall use both, Requested NSSAI (which is based on the Allowed NSSAI and Configured NSSAI) and the 'requested isolated NSSAI' which is based on the 'allowed isolated NSSAI', When the UE initiate Service Request or PDU session establishments, the UE may use any S-NSSAI from the Allowed NSSAI or from the allowed isolated NSSAI.

It will be appreciated that the request or indication from the UE to register to an isolated network slice (which could also be regarded as a dedicated network slice or any other annotation for it being isolated or dedicated) could take different forms and presentations in the Registration Request, in the Registration Accept messages, in the Cipher Mode Complete message or in any other message that is used to relay that request from the UE. For example, the request or indication for isolated network slice selection by the UE and its confirmation by the network could take the form of:

A new parameter similar to the 'requested isolated NSSAI' parameter and the 'allowed isolated NSSAI' parameter used in the above described examples. Equally, this new parameter can be called differently like 'requested isolated S-NSSAI' and 'allowed isolated S-NSSAI' or any other name for the purpose of indicating an NSSAI or S-NSSAI that requires the use of isolated network slice or network slice instance.

A new field added to the existing definitions for NSSAI or S-NSSAI in order to indicate that the related NSSAI or S-NSSAI require the use of isolated network slice.

Any other way of indication by the UE and confirmation by the network for a NSSAI or S-NSSAI that requires a registration with an isolated network slice or requires the use of isolated network slice.

The above described exemplary embodiments may also be applicable for network technologies other than 5G like 4G (LTE) and 3G where the Registration Request and Registration Accept messages would be Attach Request/ Accept or TAU Request and TAU Accept. The AMF in 5G would be MME in 4G and SGSN in 3G. UDM/UDR in 5G would be HSS in 4G and 3G.

Beneficially, the above described exemplary embodiments include, although they are not limited to, one or more of the following functionalities:

1) New parameter 'requested isolated NSSAI' in the RRC signalling (e.g. RRC Connection Request message and RRC Connection Setup Complete message) to help the RAN Node to select and AMF that supports the requested isolated network slice.
2) New parameter 'requested isolated NSSAI' in the Registration Request message to request registration with an isolated network slice that supports the requested isolated NSSAI.
3) New parameter 'allowed isolated NSSAI' in the Registration Accept message to confirm the registration with isolated network slice that supports the requested isolated NSSAI.
4) New parameter 'requested isolated NSSAI' in the Security Mode Complete message to indicate the isolated network slice to be connected with. Used when isolated network slice privacy is to be protected.
5) New parameter 'isolated NSSAI' in the UE Configuration Update Command message in order to indicate a change in the availability of the isolated NSSAI or a change in the isolated NSSAI that maps to it.
6) Fullback from isolated network slice to a non-isolated network slice when the isolated network slice become unavailable.
7) UE behaviour at registering for isolated network slice, i.e. allowed NSSAI management and the use of them for Service request and PDU session request procedures.

It can be seen that in the above embodiments:
1) The UE connects to an AMF that is designated/support an isolated network slice by including a new 'requested isolated NSSAI' in the RRC signalling (e.g. RRC Connections Establishment Request or RRC Connection Setup Complete messages) during RRC connection establishment procedure.
2) The UE registers with the selected AMF for an isolated network slice by including a new parameter 'requested isolated NSSAI' in the Registration Request message and receiving a new parameter 'allowed isolated NSSAI' as confirmation within the Registration Accept message.
3) Registration with default AMF and then re-routing to and AMF that supports the requested isolated network slice if it could not be selected by the RAN node in the first place.
4) Requested isolated NSSAI provision to the AMF with the Security procedure (i.e. Security Mode Complete message) to protect the isolated network slice.
5) Fall-back to a normal (non-isolated) network slice when the requested isolated network slice not available, or becomes unavailable.

The proposed exemplary embodiments allow for isolated network selection.

Exemplary embodiments have been described above. As those skilled in the art will appreciate, a number of modifications and alternatives can be made to the above embodiments whilst still benefiting from the inventions embodied therein. By way of illustration, only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above embodiments are also applicable to 'non-mobile' or generally stationary user equipment.

The above-described message transmitted by the UE to the network may comprise a registration request message including a Network Slice Selection Assistance Information (NSSAI) parameter. The information may be included as a separate parameter in the message (e.g. from a parameter related to any compatible network slice). The message including the information may comprise a security mode complete message.

The information may be used, by the network, to select an access and mobility management function (AMF) for the UE.

The one or more network slices that is/are not compatible with at least one allowed network slice may be ordered in a priority order. The one or more network slices that is/are not compatible with at least one allowed network slice may comprise one or more isolated network slice. The one or more network slices that is/are not compatible with at least one allowed network slice may comprise mutually exclusive network slices.

The method performed by the UE may further comprise maintaining a separate record for the one or more network slices that is/are not compatible with at least one allowed network slice (e.g. a separate record for isolated or mutually exclusive network slices from a record for other network slices).

The method performed by the AMF may further comprise validating a subscription for a network slice corresponding to at least one network slice that is not compatible with at least one allowed network slice. The method may comprise authenticating at least one network slice that is not compatible with at least one allowed network slice after performing a normal authentication. The method may also comprise re-routing the UE to another AMF that supports at least one of the one or more network slices that is/are not compatible with at least one allowed network slice.

Various other modifications will be apparent to those skilled in the art and will not be described in further detail here.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Abbreviations and Terminology

3GPP 3rd Generation Partnership Project
5G-RAN 5G Radio Access Network
5GS 5G System
AMF Access and Mobility Management Function
AS Access Stratum
AUSF Authentication Server Function
gNB next Generation NodeB
NAS Non Access Stratum
NEF Network Exposure Function
NSSF Network Slice Selection Function
PCF Policy Control Function
RAN Radio Access Network
RRC Radio Resource Control
UDM Unified Data Management
UDR Unified Data Repository
UE User Equipment

The invention claimed is:

1. A method performed by a user equipment (UE), the method comprising:
   transmitting, to a network, a message for registration of the UE;
   wherein the message comprises single network slice selection assistance information (S-NSSAI) related to at least one network slice that has not been added to at least one allowed network slice selection assistance information (NSSAI) for an authentication at an access and mobility management function (AMF); and
   receiving from the AMF, once authentication has been complete, a registration accept message comprising an allowed NSSAI to which the S-NSSAI has been added, wherein the authentication is additional authentication after performing a normal authentication.

2. The method according to claim 1, wherein the message for registration comprises a registration request message, which comprises an NSSAI parameter comprising the S-NSSAI.

3. The method according to claim 2, wherein the S-NSSAI is a first S-NSSAI that is included in a first NSSAI parameter, the first NSSAI parameter being separate from a second NSSAI parameter comprising any further S-NSSAI that is included in the at least one allowed NSSAI to which the first S-NSSAI has not been added.

4. The method according to claim 1, wherein the message for the registration comprises a security mode complete message.

5. The method according to claim 1, wherein the S-NSSAI is configured to enable the network to select the AMF for the UE.

6. The method according to claim 1, wherein the S-NSSAI included in the message for registration comprises respective S-NSSAI related to each of a plurality of network slices ordered in a priority order.

7. The method according to claim 1, wherein the S-NSSAI included in the message for registration comprises S-NSSAI for at least one isolated network slice.

8. The method according to claim 1, wherein the S-NSSAI included in the message for registration comprises S-NSSAI for mutually exclusive network slices.

9. The method according to claim 1, the method further comprising: maintaining a separate record for the at least one network slice for which the S-NSSAI included in the message for registration has not been added to the at least one allowed NSSAI.

10. A method performed by an access and mobility management function (AMF), the method comprising:
  receiving, via a base station, a message for registration of a user equipment (UE),
    wherein the message comprises single network slice selection assistance information (S-NSSAI) related to at least one network slice that has not been added to at least one allowed network slice selection assistance information (NSSAI);
  performing authentication for the at least one network slice, and once the authentication has been performed, adding the S-NSSAI to the allowed NSSAI; and
  sending, to the UE, a registration accept message comprising the allowed NSSAI to which the S-NSSAI has been added,
    wherein the authentication is additional authentication after performing a normal authentication.

11. The method according to claim 10, the method further comprising validating a subscription for a network slice corresponding to the at least one network slice for which the S-NSSAI included in the message for registration has not been added to the at least one allowed NSSAI.

12. A user equipment (UE) comprising:
  a controller and a transceiver, wherein the controller is configured to control the transceiver to transmit, to a network, a message for registration of the UE;
  wherein the message comprises single network slice selection assistance information (S-NSSAI) related to at least one network slice that has not been added to at least one allowed network slice selection assistance information (NSSAI) for an authentication at an access and mobility management function (AMF),
  wherein the transceiver is configured to receive, from the AMF, once authentication has been complete, a registration accept message comprising an allowed NSSAI to which the S-NSSAI has been added, and
  wherein the authentication is additional authentication after performing a normal authentication.

13. An access and mobility management function (AMF) comprising:
  a controller and a transceiver, wherein the controller is configured to control the transceiver to receive, via a base station, a message for registration of a user equipment (UE);
  wherein the message comprises single network slice selection assistance information (S-NSSAI) related to at least one network slice that has not been added to at least one allowed network slice selection assistance information (NSSAI),
  wherein the AMF is configured to perform authentication for the at least one network slice, and once the authentication has been performed, adding the S-NSSAI to the allowed NSSAI,
  wherein the transceiver is configured to send, to the UE, a registration accept message comprising the allowed NSSAI to which the S-NSSAI has been added, and
  wherein the authentication is additional authentication after performing a normal authentication.

* * * * *